United States Patent [19]
Kubo et al.

[11] Patent Number: 5,218,505
[45] Date of Patent: Jun. 8, 1993

[54] SUPERCONDUCTOR COIL SYSTEM AND METHOD OF OPERATING THE SAME

[75] Inventors: Morihiro Kubo; Yukio Ishigaki, both of Hitachi, Japan

[73] Assignees: Hitachi, Ltd.; Hitachi Engineering Service Co., Ltd., both of Tokyo, Japan

[21] Appl. No.: 549,070

[22] Filed: Jul. 6, 1990

[30] Foreign Application Priority Data

Jul. 7, 1989 [JP] Japan ................................. 1-176037

[51] Int. Cl.$^5$ ............................................. H01H 9/42
[52] U.S. Cl. ......................................... 361/19; 361/11; 505/850
[58] Field of Search ................ 361/19, 58, 10, 11, 361/111, 141; 505/850, 881; 323/360

[56] References Cited

U.S. PATENT DOCUMENTS

| | | | |
|---|---|---|---|
| 3,304,466 | 2/1967 | Minnich et al. | 361/19 |
| 3,522,472 | 8/1970 | Breitholtz | 361/11 |
| 3,737,724 | 6/1973 | Salge et al. | 361/11 |
| 4,550,356 | 10/1985 | Takahashi | 361/11 |

FOREIGN PATENT DOCUMENTS 420383 3/1967 Switzerland.

OTHER PUBLICATIONS

*Patent Abstracts of Japan*, vol. 8, No. 142, E-254, Jul. 3, 1984 (for Japanese Kokai 59-52809).

Primary Examiner—Todd E. DeBoer
Attorney, Agent, or Firm—Antonelli, Terry, Stout & Kraus

[57] ABSTRACT

A superconducting coil system includes an excitation power source, a superconducting coil, a DC circuit breaker connected in series between the excitation power source and the superconducting coil to disconnect them when quenching occurs, a protective resistor connected in a parallel manner to the superconducting coil for dissipating the energy accumulated in the superconducting coil when the quenching occurs, and a switch provided as a bypass of the DC circuit breaker, the switch being closed during the normal operation to pass the energy from the excitation power source to the superconducting coil through a resistor and being opened when the quenching occurs.

15 Claims, 3 Drawing Sheets

SUPERCONDUCTOR COIL SYSTEM AND METHOD OF OPERATING THE SAME

BACKGROUND OF THE INVENTION

1. Field of the Invention

The present invention relates to a superconducting coil system in which energy is supplied from an excitation power source to a superconducting coil through a DC circuit breaker to excite the coil. Particularly, the present invention pertains to a superconducting coil protecting device for protecting the superconducting coil from being damaged due to quenching by dissipating the energy accumulated through a protective resistor connected in a parallel manner to the superconducting coil when the superconducting coil undergoes quenching, as well as a method of operating such a protecting device.

2. Description of the Related Art

Recently, the use of superconducting coils in various apparatuses, such as nuclear fusion devices, accelerators, power energy storage facilities and linear motors, has been greatly increasing. Superconducting coils normally have almost zero electrical resistance. However, they sometimes undergo a transition from a superconductive state to a normal conductive state due to an abrupt change in the magnetic field or a temperature anomaly. This phenomenon involving breakdown of the superconductive state is called quenching. Quenching may cause an increase in pressure due to abnormal evaporation of liquid helium employed for cooling the superconducting coil.

Accordingly, in the conventional superconducting coil system in which energy is supplied from an excitation power source 3 to a load coil, i.e., a superconducting coil, when quenching occurs, the superconducting coil 1 has been protected by dissipating the energy accumulated in the superconducting coil 1 through a protective resistor 2, as shown in FIG. 4, thereby restricting quenching from increasing. That is, once quenching occurs, a looped circuit consisting of the excitation power source 3 and the superconducting coil 1 is interrupted by a DC circuit breaker 4 to shift the current which flows in the looped circuit to the protective resistor 2 connected in a parallel manner to the superconducting coil 1. As a result, the DC circuit breaker 4 which is capable of interrupting a large DC current is required. In the basic superconducting coil system shown in FIG. 4, the portion of the circuit between the protective resistor 2 and the DC circuit breaker 4 is generally called a quenching protecting device.

Recently, the scale of the superconducting coil systems has been expanded. This has resulted in an increase in the current which flows in the superconducting coil 1. Moreover, the number of superconducting coil systems designed for continuous operation has been increasing.

The above developments have made it necessary to have a method of quenching protection which employs a DC circuit breaker 4 capable of interrupting a large DC current and of continuous operation.

However, a single DC circuit breaker is generally designed to handle only a small current, e.g., about 3000 A, and therefore cannot withstand a continuously large current. Accordingly, in the conventional method, a plurality of DC circuit breakers have been connected in a parallel manner, as shown in FIG. 5.

Such conventional protection devices have been disclosed in, for example, Japanese Patent Laid-Open No. 198613/1982.

In this conventional technique, interruption of DC current for quenching protection requires a plurality of DC circuit breakers, making the protection device very expensive.

Furthermore, it is very difficult to simultaneously operate a plurality of parallel-connected DC circuit breakers, and variations in the times of the operations of these circuit breakers may cause damage to the DC circuit breakers or the components which constitute the superconducting coil system.

SUMMARY OF THE INVENTION

An object of the present invention is to provide a superconducting coil system with a superconducting coil protecting device which is capable of handling a large, continuously flowing DC current and of interrupting that large DC current in an emergency such as quenching, and which is simple and inexpensive, and a method of operating such a superconducting coil system.

In order to achieve the aforementioned object, the present invention provides a superconducting coil system in which energy is supplied from an excitation power source to a superconducting coil through a DC circuit breaker during a normal operation and in which, when quenching occurs, supply of the energy to the superconducting coil is interrupted by the DC circuit breaker while the energy accumulated in the superconducting coil is dissipated through a protective resistor connected in a parallel manner to the superconducting coil to protect the superconducting coil from being damaged due to quenching. In this superconducting coil system, a switch, which is closed during the normal operation to pass the energy from the excitation power source to the superconducting coil through a resistor and which opens when quenching occurs, is connected in a parallel manner to the DC circuit breaker.

The resistor connected to the switch may be a fine fixed resistor or a variable resistor whose resistance is low during the normal operation but which rises when quenching occurs. Alternatively, the resistor may be an arc resistance of the switch itself.

In either case, the superconducting coil system may include a detector for detecting quenching of the superconducting coil and a control means for outputting to the DC circuit breaker an instruction to interrupt energy from the excitation power source in response to a detection signal of the quenching detector.

Furthermore, inclusion of a current detector for detecting a current which flows through the switch and a control means for outputting an instruction to open the switch when the current detected by the current detector is almost zero is preferred.

The superconducting coil system of the type described above can be applied to the plasma heating means for a nuclear fusion apparatus, the particle accelerating means for an accelerator, the energy storage means for an energy storage facility, or the motor coil for a linear motor.

In the present invention, a large DC current continuously flows through an inexpensive switch connected in a parallel manner to the DC circuit breaker during a normal operation. When quenching occurs, the dc circuit breaker is energized to cause the large current to flow through the DC circuit breaker. Thereafter, the switch is opened and the DC current is then interrupted. Completion of the DC current interruption operation allows the energy in the superconducting coil to be dissipated through the protective resistor.

Thus, the current flows through the DC circuit breaker only when quenching occurs. In consequence, the use of a DC circuit breaker which has a small capacity and is therefore inexpensive is possible, and a large current which continuously flows in the superconducting coil can be reliably interrupted.

DESCRIPTION OF THE PREFERRED EMBODIMENTS

Figure 1:
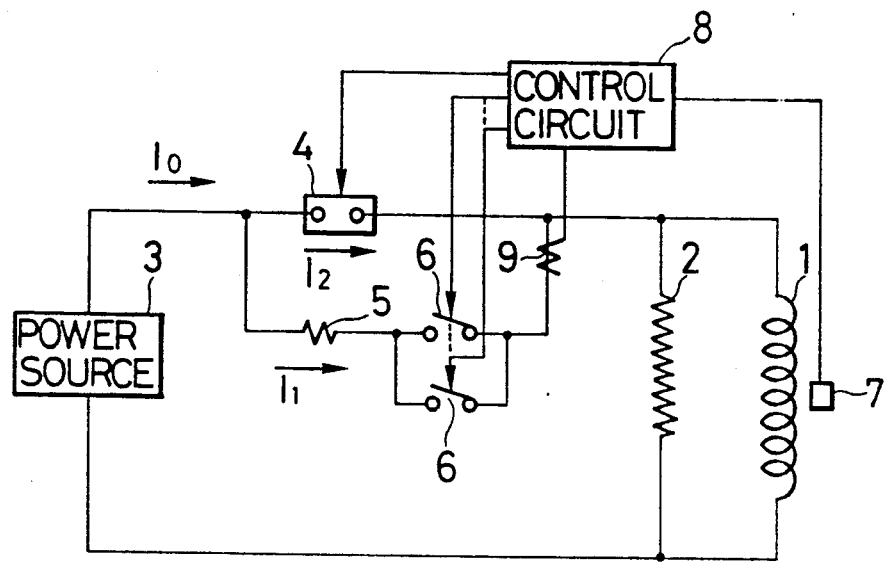
FIG. 1 is a system diagram of an embodiment of a superconducting coil system with a superconducting coil protecting device according to the present invention.

An embodiment of a superconducting coil system with a superconducting coil protecting device according to the present invention will be described below with reference to FIG. 1. A basic circuit of the superconducting coil system is arranged such that a protective resistor 2 is connected in a parallel manner to a superconducting coil 1 to be protected, and such that a DC current is supplied from an excitation power source 3 to the superconducting coil 1 through a DC circuit breaker 4. In this invention, the superconducting coil system is further arranged such that a group of switches 6 having a fine fixed resistor 5 is connected in a parallel manner to the DC circuit breaker 4. A reference numeral 7 denotes a quenching detector for detecting quenching of the superconducting coil 1, and 8 denotes a control circuit for controlling the operation of the DC circuit breaker 4 and that of the switch group 6 on the basis of the detection signal of the quenching detector 7 and that of a current detector 9 for detecting a current which flows in the switch group 6. As stated above, although the DC circuit breaker 4 is capable of handling only a continuous current of, for example, 3000 A, each switch 6 is capable of handling a continuous current of, for example, 27,000 to 28,000 A. Thus, it is not always necessary to provide a plurality of switches 6.

In the thus-arranged superconducting coil system shown in FIG. 1, the DC circuit breaker 4 is open during the normal operation and a large DC current $I_0$ therefore flows continuously through the group of switches 6 having the fine fixed resistor 5.

Once quenching of the superconducting coil 1 occurs, the quenching detector 7 detects it, and sends a detection signal to the control circuit 8. Upon receipt of the quenching detecting signal, the control circuit 8 gives an instruction to the DC circuit breaker 4 and thereby closes it. Once the DC circuit breaker 4 has been closed, the DC current $I_0$ also flows through the DC circuit breaker 4. The ratio of the current $I_1$ which flows through the group of switches 6 to the current $I_2$ which flows through the DC circuit breaker 4 is given by $$I_1 : I_2 = r_2 : r_1 \tag{1}$$

where $r_1$ is the resistance of the fine fixed resistor 5, and $r_2$ is the internal resistance of the DC circuit breaker 4. When $r_2 > > r_1$, i.e., when the resistance of the fine fixed resistor 5 is sufficiently larger than the resistance of the DC circuit breaker 4, most of the DC current $I_0$ flows through the DC circuit breaker 4.

Subsequently, upon receipt of a detection signal from the current detector 9 indicating that the current which flows in the group of switches 6 is almost zero, the control circuit 8 gives an instruction to the group of switches 6 and thereby opens it. Once the group of switches 6 have been open, all of the large DC current $I_0$ which would flow through the group of switches 6 during the normal operation flows now through the DC circuit breaker 4.

Thereafter, the DC circuit breaker 4 opens the circuit by the instruction from the control circuit 8. Thus, the energy accumulated in the superconducting coil 1 is adequately dissipated through the protective resistor 2, and the superconducting coil 1 is thereby protected from damage caused by quenching.

In the above-described embodiment, the superconducting coil protecting device is comprised of the group of inexpensive switches 6, the single DC circuit breaker 4 and the protective resistor 2. During the normal operation, the continuous large DC current flows through the group of switches 6 but does not flow through the DC circuit breaker 4. When quenching occurs, the circuit breaker 4 is energized, and immediately after that, the circuit is interrupted by the DC circuit breaker 4.

This superconducting coil protecting device employs, together with the group of inexpensive switches 6 and the fine fixed resistor 5, only the single expensive DC circuit breaker 4. As a result, production cost of the superconducting coil system can be greatly reduced.

Furthermore, when quenching occurs, the single DC circuit breaker 4 is closed temporarily. Thereafter, when the current which flows through the group of switches 6 is reduced to almost zero, the switches 6 are opened, and DC circuit breaker 4 is then opened. In consequence, precise control of the opening/closing of the switches and that of the DC circuit breaker is not required, which would be necessary in the conventional technique in which the operation of a plurality of DC circuit breakers must be synchronized. Thus, damage to the DC circuit breaker 4 or to the group of switches 6 caused by the relative asynchronization of the operation of these components can substantially be eliminated.

Figure 2:
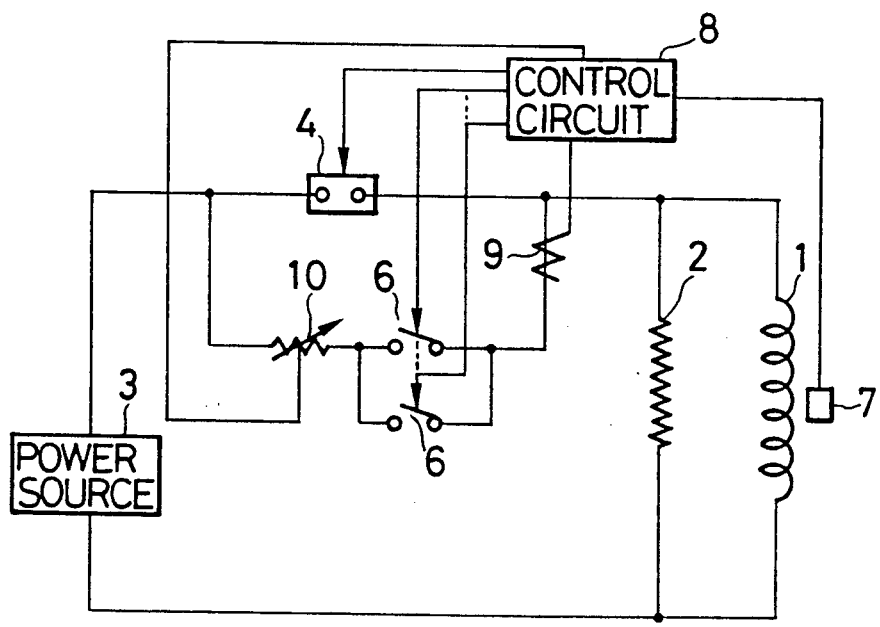
FIG. 2 is a system diagram of another embodiment of the superconducting coil system according to the present invention.

In the above-described embodiment, the group of switches 6 having the fine fixed resistor 5 is connected in a parallel manner to the DC circuit breaker 4. However, the fine fixed resistor 5 may be replaced by a variable resistor 10 as shown in FIG. 2.

In that case, a shift of current from the group of switches 6 to the DC circuit breaker 4 can be performed smoothly when the variable resistor 10 is arranged such that it has zero resistance during the normal operation to reduce the loss and such that the resistance thereof increases in response to the signal from the control circuit 8 once quenching occurs.

Figure 3:
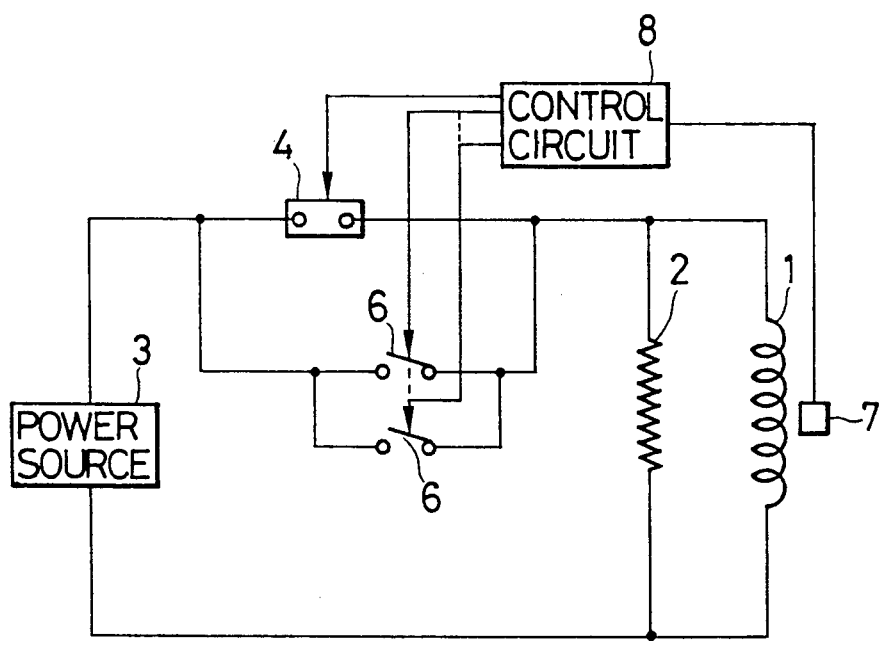
FIG. 3 is a system diagram of another embodiment of the superconducting coil system according to the present invention.
Figure 4:
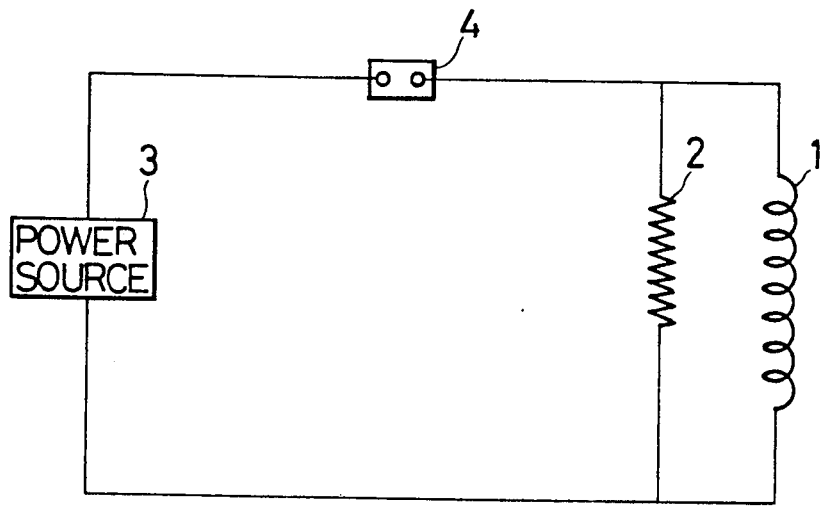
FIGS. 4 and 5 are system diagrams of a conventional superconducting coil system.
Figure 5:
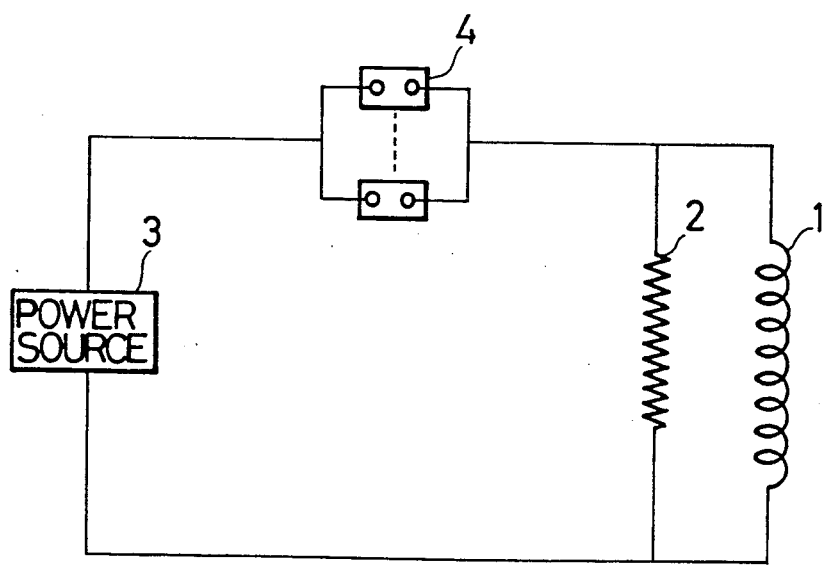

Furthermore, the fine fixed resistor 5 may also be replaced by an arc resistance generated in the group of switches 6 when it is opened as shown in FIG. 3. In this method, a current also flows through the DC circuit breaker 4 during the normal operation, so the operation of closing the DC circuit breaker 4, which would be required when quenching occurs, can be eliminated. In consequence, the time required to interrupt the circuit by the DC circuit breaker can greatly be reduced, and the superconducting coil 1 can therefore be protected more reliably.

Furthermore, in either of the above-described cases, the group of switches 6 may be replaced by a usually employed circuit breaker.

The present invention can be applied not only to the superconducting coil system which includes a mechanically operated DC circuit breaker but also to a superconductor coil system including a semiconductor DC circuit breaker, such as a thyristor.

The present invention has the advantages that:

(1) Since the quenching protecting device includes the single expensive DC circuit breaker in addition to the group of inexpensive switches and the inexpensive fine resistor, production cost of the superconducting coil system can be greatly reduced.

(2) When quenching occurs, the single DC circuit breaker is temporarily closed. Thereafter, when the current which flows through the group of switches is reduced to almost zero, the switches are opened, and the DC circuit breaker is then opened. In consequence, strict synchronization of the operation of the DC circuit breaker and the switches is not required, and damage to the DC circuit breaker and to the switches caused by the asynchronization of the operation thereof is thus substantially eliminated.

(3) If a variable resistor whose resistance is zero during the normal operation and increases when quenching occurs is employed as the fine resistor, a current can be shifted from the group of switches to the DC circuit breaker smoothly.

(4) If an arc resistance generated in the group of switches when it is open is employed as the fine resistor, the current also flows through the DC circuit breaker during the normal operation, so the operation of closing the DC circuit breaker, which is required when quenching occurs, is thus eliminated. In consequence, the time required to break the circuit by the DC circuit breaker can greatly be reduced, and the superconducting coil can therefore be reliably protected.

What is claimed is:

1. A superconducting coil system comprising:
a superconducting coil;
an excitation power source;
a DC circuit breaker connected between the superconducting coil and the excitation power source;
a switching circuit connected in parallel with the DC circuit breaker and including:
  a resistor having a resistance greater than an internal resistance of the DC circuit breaker when the DC circuit breaker is closed, and
  at least one switch connected in series with the resistor;
control means for
  opening the DC circuit breaker and closing the at least one switch to initiate a normal operation of the superconducting coil system in which energy flows from the excitation power source to the superconducting coil through the switching circuit,
  closing the DC circuit breaker when quenching occurs in the superconducting coil, thereby causing substantially all of the energy flowing from the excitation power source to the superconducting coil through the switching circuit to flow from the excitation power source to the superconducting coil through the DC circuit breaker,
  opening the at least one switch, after the control means closes the DC circuit breaker, when the energy flowing from the excitation power source to the superconducting coil through the switching means has fallen to a predetermined level, and
  opening the DC circuit breaker, after the control means opens the at least one switch, when a predetermined condition has occurred, thereby interrupting the flow of energy from the excitation power source to the superconducting coil; and
a protective resistor connected in parallel with the superconducting coil for dissipating energy from the excitation power source accumulated in the superconducting coil when the flow of energy from the excitation power source to the superconducting coil is interrupted by the opening of the DC circuit breaker, thereby preventing the superconducting coil from being damaged as are result of the quenching.

2. A superconducting coil system according to claim 1, wherein the resistor is a fine fixed resistor.

3. A superconducting coil system according to claim 2, wherein the control means includes a quenching detector for detecting quenching of the superconducting coil.

4. A superconducting coil system according to claim 2, wherein the control means includes a current detector for detecting a current flowing from the excitation power source to the superconducting coil through the at least one switch, and wherein the control means opens the at least one switch, after the control means closes the DC circuit breaker, when the current flowing through the at least one switch is substantially zero.

5. A superconducting coil system according to claim 1, wherein the resistor is a variable resistor, and wherein the control means controls the variable resistor to have a first resistance during the normal operation of the superconducting coil system, and to have a second resistance greater than the first resistance and greater than the internal resistance of the DC circuit breaker when the control means closes the DC circuit breaker when quenching occurs in the superconducting coil.

6. A superconducting coil system according to claim 5, wherein the control means includes a quenching detector for detecting quenching of the superconducting coil.

7. A superconducting coil system according to claim 5, wherein the control means includes a current detector for detecting a current flowing from the excitation power source to the superconducting coil through the at least one switch, and wherein the control means opens the at least one switch, after the control means closes the DC circuit breaker, when the current flowing through the at least one switch is substantially zero.

8. A superconducting coil system according to claim 1, wherein the control means includes a quenching detector for detecting quenching of the superconducting coil.

9. A superconducting coil system according to claim 8, wherein the control means includes a current detector for detecting a current flowing from the excitation power source to the superconducting coil through the at least one switch, and wherein the control means opens the at least one switch, after the control means closes the DC circuit breaker, when the current flowing through the at least one switch is substantially zero.

10. A superconducting coil system according to claim 1, wherein the control means includes a current detector for detecting a current flowing from the excitation power source to the superconducting coil through the at least one switch, and wherein the control means opens the at least one switch, after the control means closes the DC circuit breaker, when the current flowing through the at least one switch is substantially zero.

11. A superconducting coil system comprising:
a superconducting coil ;
an excitation power source;
a DC circuit breaker connected between the superconducting coil and the excitation power source;
at least one switch connected in parallel with the DC circuit breaker;
control means for
closing the DC circuit breaker and closing the at least one switch to initiate a normal operation of the superconducting coil system in which energy flows from the excitation power source to the superconducting coil through the DC circuit breaker and the at least one switch,
opening the at least one switch when quenching occurs in the superconducting coil, thereby generating an arc resistance across the at least one switch and causing substantially all of the energy flowing from the excitation power source to the superconducting coil through the DC circuit breaker and the at least one switch to flow from the excitation power source to the superconducting coil through the DC circuit breaker, and
opening the DC circuit breaker, after the control means opens the at least one switch, when a predetermined condition has occurred, thereby interrupting the flow of energy from the excitation power source to the superconducting coil; and
a protective resistor connected in parallel with the superconducting coil for dissipating energy from the excitation power source accumulated in the superconducting coil when the flow of energy from the excitation power source to the superconducting coil is interrupted by the opening of the DC circuit breaker, thereby preventing the superconducting coil from being damaged as a result of the quenching.

12. A superconducting coil system according to claim 11, wherein the control means includes a quenching detector for detecting quenching of the superconducting coil.

13. A method of operating a superconducting coil system comprising:
a superconducting coil;
an excitation power source;
a DC circuit breaker connected between the superconducting coil and the excitation power source;
a switching circuit connected in parallel with the DC circuit breaker and including:
a resistor having a resistance greater than an internal resistance of the DC circuit breaker when the DC circuit breaker is closed, and
at least one switch connected in series with the resistor; and
a protective resistor connected in parallel with the superconducting coil;
the method comprising the steps of:
opening the DC circuit breaker and closing the at least one switch to initiate a normal operation of the superconducting coil system in which energy flows from the excitation power source to the superconducting coil through the switching circuit;
closing the DC circuit breaker when quenching occurs in the superconducting coil, thereby causing substantially all of the energy flowing from the excitation power source to the superconducting coil through the switching circuit to flow from the excitation power source to the superconducting coil through the DC circuit breaker;
opening the at least one switch, after the DC circuit breaker is closed, when the energy flowing from the excitation power source to the superconducting coil through the switching means has fallen to a predetermined level; and
opening the DC circuit breaker, after the at least one switch is open, when a predetermined condition has occurred, thereby interrupting the flow of energy from the excitation power source to the superconducting coil;
wherein the protective resistor dissipates energy from the excitation power source accumulated in the superconducting coil when the flow of energy from the excitation power source to the superconducting coil is interrupted by the opening of the DC circuit breaker, thereby preventing the superconducting coil from being damaged as a result of the quenching.

14. A method according to claim 13, wherein the step of opening the at least one switch, after the DC circuit breaker is closed, is performed after a current flowing from the excitation power source to the superconducting coil through the at least one switch is substantially zero.

15. A method of operating a superconducting coil system comprising:
a superconducting coil;
an excitation power source;
a DC circuit breaker connected between the superconducting coil and the excitation power source;
at least one switch connected in parallel with the DC circuit breaker; and
a protective resistor connected in parallel with the superconducting coil;
the method comprising the steps of:
closing the DC circuit breaker and closing the at least one switch to initiate a normal operation of the superconducting coil system in which energy flows from the excitation power source to the superconducting coil through the DC circuit breaker and the at least one switch;
opening the at least one switch when quenching occurs in the superconducting coil, thereby generating an arc resistance across the at least one switch and causing substantially all of the energy flowing from the excitation power source to the superconducting coil through the DC circuit breaker and the at least one switch to flow from the excitation power source to the superconducting coil through the DC circuit breaker; and
opening the DC circuit breaker, after the at least one switch is open, when a predetermined condition has occurred, thereby interrupting the flow of energy from the excitation power source to the superconducting coil;

wherein the protective resistor dissipates energy from the excitation power source accumulated in the superconducting coil when the flow of energy from the excitation power source to the superconducting coil is interrupted by the opening of the DC circuit breaker, thereby preventing the superconducting coil from being damaged as a result of the quenching.

* * * * *